April 11, 1944.    P. M. FREER    2,346,480
BRAKE
Filed Nov. 2, 1942    2 Sheets-Sheet 1
FIG.I.
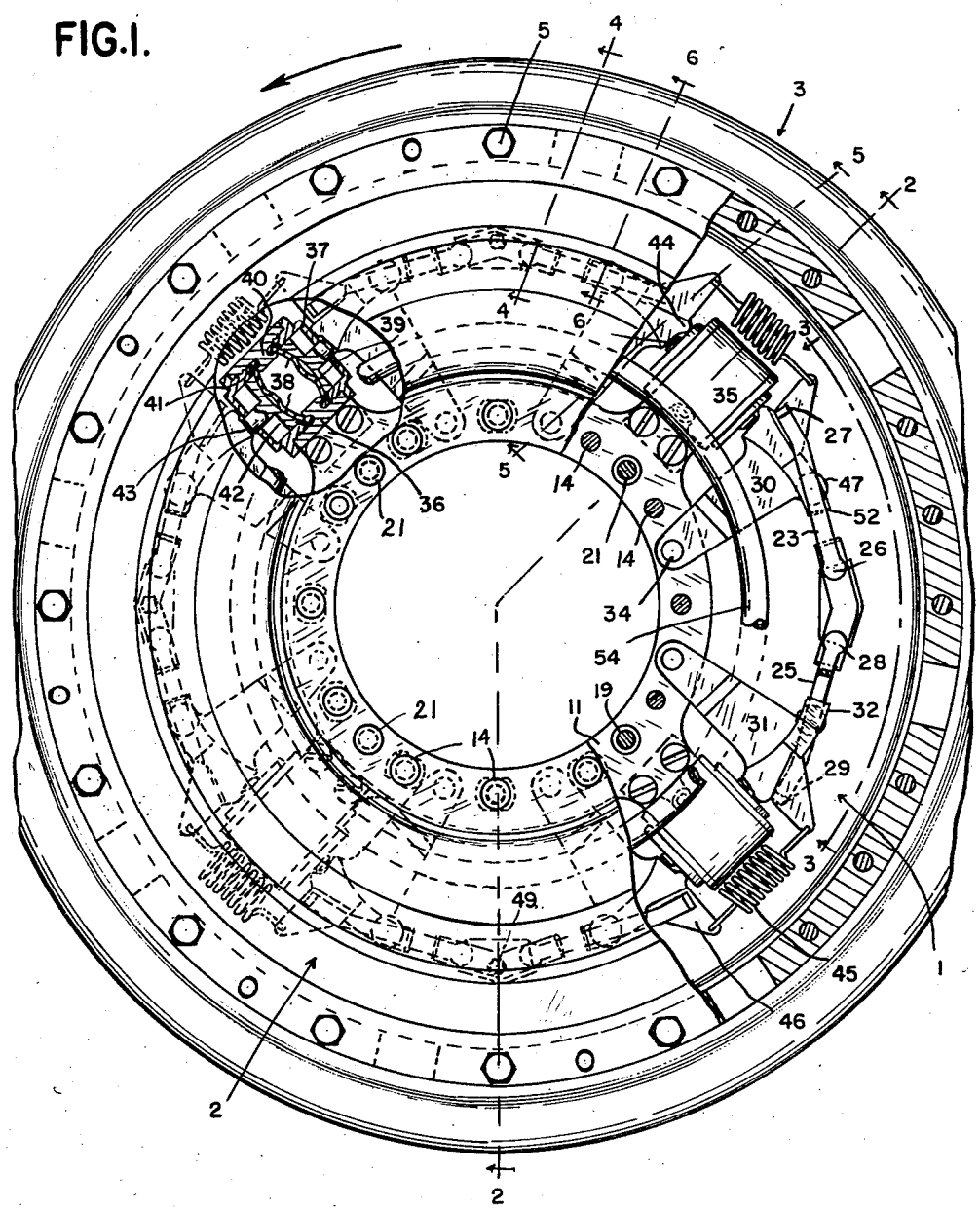
INVENTOR.
PHELPS M. FREER.
BY
ATTORNEYS April 11, 1944. P. M. FREER 2,346,480
BRAKE
Filed Nov. 2, 1942 2 Sheets-Sheet 2
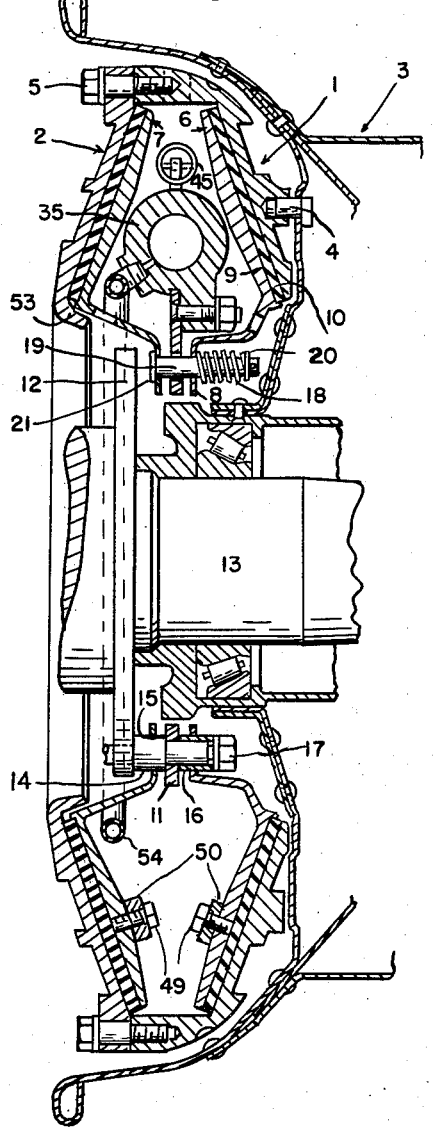
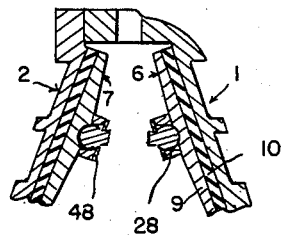
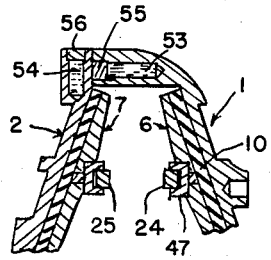
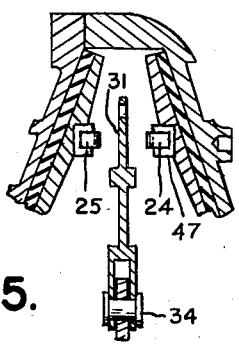
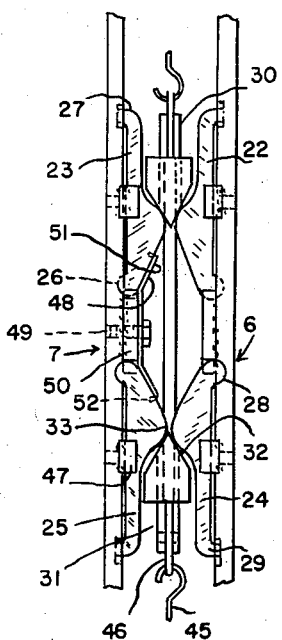
INVENTOR.
PHELPS M. FREER
ATTORNEYS Patented Apr. 11, 1944

2,346,480

UNITED STATES PATENT OFFICE 2,346,480

BRAKE

Phelps M. Freer, Detroit, Mich.

Application November 2, 1942, Serial No. 464,225

3 Claims. (Cl. 188—72)

The invention relates to brakes and refers more particularly to disc brakes.

The invention has for one of its objects to so construct a disc brake that it is compact and powerful and its parts are relatively easy to manufacture and assemble.

The invention has for other objects to provide a simple actuating mechanism; to provide the actuating mechanism with a link having a constant angular relation to the friction member to be actuated regardless of brake lining wear; to provide the actuating mechanism with a link having longitudinally spaced contacts with the friction member to be actuated; and to provide an actuating member engageable with each link intermediate the contacts.

The invention has for a further object to provide a brake constructed to be readily detachably connected to a wheel when the latter is being mounted.

These and other objects of the invention will become apparent from the following description, taken in connection with the accompanying drawings, in which Figure 1 is an inboard elevation, with parts broken away, of a brake embodying the invention;

Figures 2, 3, 4, 5 and 6 are cross sections on the lines 2—2, 3—3, 4—4, 5—5 and 6—6, respectively, of Figure 1.

The brake, as illustrated in the present instance, is designed particularly for use with an airplane landing wheel, although it is apparent that it may be otherwise used, as with motor vehicles and the like. The brake comprises a pair of outer rotatable friction members, a pair of inner non-rotatable friction members between the outer friction members, and actuating mechanism for moving the inner friction members axially in opposite directions into engagement with the outer friction members. Both the outer and inner friction members are in the nature of discs having radially outwardly converging friction surfaces.

The pair of outer rotatable friction members comprise the outboard friction member 1 and the inboard friction member 2, the outboard friction member being detachably connected to the inboard disc element of the wheel 3 by means of the dowels 4 which are secured to the inboard disc element and slidably extend into the outboard friction member. The inboard friction member 2 is secured to the outboard friction member 1 to rotate therewith by means of the bolts 5 which extend through the radially outer edge portion of the inboard friction member and are threaded into the radially outer edge portion of the outboard friction member. The pair of inner rotatable friction members comprise the outboard and inboard friction members 6 and 7, respectively, which are symmetrically arranged and each of which has the radially extending mounting portion 8 and the friction portion 9 to which is secured the brake lining 10. 11 is an anchor disc extending radially between the inner friction members and fixedly mounted in predetermined axial relation to the wheel 3 on the annular flange 12 of the support having the shaft 13 on which the wheel 3 is journaled in predetermined axial position. As shown, 14 are angularly spaced studs extending in an outboard direction from the flange 12 and having enlarged and reduced portions providing the annular shoulders 15 against which the disc is clamped by means of the tubular spacers 16 sleeved over the reduced portions and secured in place by the nuts 17 threaded on the outboard ends of the reduced portions. The mounting portions 8 of the inner friction members are located at opposite sides of the anchor disc with the mounting portion of the outboard friction member slidable on the spacers 16 and the mounting portion of the inboard friction member slidable on the enlarged portions of the studs 14. The holes in the mounting portions of both of these inner friction members are preferably elongated in a circumferential direction. The inner friction members are resiliently urged toward each other by means of the coil springs 18 which encircle the angularly spaced pins 19 and abut the mounting portion 8 of the outboard friction member 6 and the collars 20 secured to the outboard ends of the pins. The pins have the heads 21 at the inboard side of the mounting portion 8 of the inboard friction member 7. The pins extend freely through the anchor disc 11 to permit limited angular movement of the inner friction members relative to the anchor disc.

The actuating mechanism comprises sets of opposed pairs of links between the inner friction members, levers for spreading the links apart, and actuators between the adjacent levers of adjacent sets. More in detail, each set of opposed pairs of links comprises the pair of links 22 and 23 and the pair of links 24 and 25 with the links 22 and 23 opposite each other and the links 24 and 25 opposite each other. The links 22 and 23 have the ball-shaped ends 26 and the lateral ends 27, the ball-shaped ends engaging in correspondingly shaped recesses in the disc portions of the outboard and inboard non-rotatable friction members 6 and 7, respectively, and the lateral ends 27 engaging in elongated flat recesses in the same disc portions. The links 24 and 25 are similarly constructed with the ball-shaped ends 28 and the lateral ends 29. The links 24 and 25, however, are opposed to the links 22 and 23 with the ball-shaped ends 28 nearest the ball-shaped ends 26. For spreading apart the pairs of links of each set, I have provided the levers 30 and 31 having the opposed V-shaped wedges or cams 32 at the radially outer ends of their bodies. The wedges or cams extend between and engage the like bearing surfaces 33 upon the adjacent edges of the links with the lever 30 arranged to spread apart the links 22 and 23 and the lever 31 arranged to spread apart the links 24 and 25. The bearing surfaces are rounded and are located between the ball-shaped and lateral ends of the links preferably nearer the ball-shaped ends. The levers 30 and 31 are pivotally mounted at the radially inner ends of their bodies upon the anchor disc 11 by the pins 34, clearance being provided between the levers and the anchor disc to permit the wedges or cams of the levers to equally engage the bearing surfaces on the links. The actuators for swinging the levers 30 and 31 are wheel cylinders 35 located between adjacent levers 30 and 31 of adjacent sets of pairs of links and fixedly mounted on the anchor disc 11. Each wheel cylinder comprises the housing 36, the end caps 37, the diaphragms 38 and the plungers 39. The housing has the internal annular flange 40 formed with annular grooves in its ends for engaging beads at the edges of the diaphragms. The caps are threaded into the housing and clamp the beads into the annular grooves through the intermediate wear rings 41 which non-rotatably abut the diaphragms. The plungers 39 have the heads 42 abutting the diaphragms and slidable within the caps and also have the rods 43 slidable in the ends of the caps and engageable with the radially outer ends of the bodies of the levers 30 and 31 opposite the wedges or cams. The levers have at the radially outer ends of their bodies the lateral projections 44 for abutting the ends of the caps radially outwardly of the rods 43 when the parts are in retracted or off position. As illustrated, there are four sets of pairs of links, eight levers and four actuators.

To retract the levers to off position, I have provided the coil springs 45 located radially outwardly beyond the actuators and connected at their ends to the arms 46 of the adjacent levers 30 and 31 of adjacent sets of pairs of links. The coil springs serve to resiliently hold the levers against the actuator caps which form stops.

To guide the links 22, 23, 24 and 25 and prevent the links from turning over, there are the U-shaped members 47 fixedly secured to the disc portions of the inner friction members and embracing the links intermediate their ends. For the purpose of securing the ball-shaped ends of the links in place, there are the spring clips 48 secured at their middles to the inner friction members by the bolts 49 which, as shown, are threaded into the inner friction members and the plates 50 which are welded to the inner friction members and abut adjacent ball-shaped ends. The spring clips have the diverging arms 51 which are formed at their free ends with the furcations 52. The arms extend over the adjacent ball-shaped ends and the portions of the links connecting into the ball-shaped ends and the furcations engage the sides of the links to hold the latter from turning.

For the purpose of shielding the brake lining 10 of the non-rotatable inboard friction member 7 and reinforcing the rotatable inboard friction member 2, the latter is formed with the integral annular flange 53 which extends from the radially inner edge of the inboard friction member 2 in a generally outboard direction inside the brake lining and the associated disc portion of the inboard friction member 7.

In operation, it will be seen that when braking fluid is forced under pressure into the actuators through the annular pipe 54 which is connected to all of the actuators, they are simultaneously operated to simultaneously swing all the levers 30 and 31 from their retracted or off positions. As a result, the wedges or cams 32 of the levers simultaneously spread apart the pairs of links 22 and 23 and the pairs of links 24 and 25, thereby spreading apart the inner friction members into braking engagement with the outer friction members. It will be noted in this connection that the wedges or cams exert greater pressure on the ball-shaped ends of the links than on the lateral ends since the wedges or cams engage the links nearer the ball-shaped ends than the lateral ends. With the outer friction members 1 and 2 rotating in the direction indicated by the arrow in Figure 1, the links 22 and 24 and the links 23 and 25 of the sets exert pressure upon the inner friction members 6 and 7, respectively, in sixteen angularly spaced zones until the inner friction members become energized by the respective outer friction members to rotate therewith. At this time, the rotation of the inner friction members 6 and 7 is opposed by all of the links 22 and 23, respectively, the links reacting through the levers 30 which have been swung back against the actuator caps. As a result the inner friction members are compelled to move axially into more firm braking engagement with their respective outer friction members, the ball-shaped ends of the links 22 and 23 exerting increased pressure on the inner friction members 6 and 7, respectively, in four angularly spaced zones. During this time, the ball-shaped ends and the lateral ends of the links 24 and 25 exert pressure upon the inner friction members 6 and 7, respectively, in eight angularly spaced zones. It will be noted that during the time each link bears at its ends upon the associated inner friction member this link maintains a constant angular relation to the inner friction member, regardless of brake lining wear. Upon release of the braking fluid pressure, the springs 45 return the levers 31 to their retracted or off positions and the springs 18 return the inner friction members to their retracted or off positions maintaining the links in contact with the wedges or cams of the levers and thereby axially positioning the inner friction members with respect to the support for the wheel and also the wheel when mounted on the support. It will be seen that the wheel may be readily demounted without affecting the brake. Also that the wheel may be readily mounted since the inner friction members serve to axially position the outer friction members within close limits even when there is no braking engagement.

For the purpose of facilitating the dissipation of the heat generated in braking, the outboard and inboard friction members 1 and 2, respectively, are provided at their radially outer edges with angularly spaced sealed chambers which preferably contain material of low melting point and high thermal conductivity. Examples of such material are sodium and a composition containing 55% potassium nitrate and 45% sodium nitrite. Instead of such material a material of high thermal conductivity such as mercury may be used. More in detail, the outboard friction member 1 is provided with the angularly spaced axially extending sealed chambers 53 and the inboard friction member 2 is provided with the angularly spaced radially extending sealed chambers 54. These chambers are sealed by the plugs 55 and 56, respectively, to retain the material.

What I claim as my invention is:

1. A brake comprising outer rotatable friction members, inner non-rotatable friction members between said outer members and means for moving said inner members into braking engagement with said outer members comprising opposed pairs of links between said inner members with the links of each pair opposite each other and with each link having longitudinally spaced contacts with its associated inner member, and actuating members movable in opposite directions and engageable with said opposed pairs of links intermediate the contacts.

2. A brake comprising outer rotatable friction members, inner non-rotatable friction members between said outer members, sets of opposed pairs of links between said inner members with the links of each pair opposite each other, an anchor disc extending between said inner members, levers pivotally mounted on said anchor disc and having portions extending between and engageable with the links of each pair for spreading the same apart, and actuators mounted on said anchor disc with an actuator between adjacent levers of adjacent sets of opposed pairs of links.

3. A brake comprising outer rotatable friction members, inner non-rotatable friction members between said outer members, sets of opposed pairs of links between said inner members with the links of each pair opposite each other, an anchor disc extending between said inner members, levers pivotally mounted on said anchor disc and having portions extending between and engageable with the links of each pair for spreading the same apart, wheel cylinders mounted on said anchor disc for actuating the adjacent levers of adjacent sets of opposed pairs of links, said wheel cylinders forming stops for said levers, and springs between said levers for yieldably urging the same toward said wheel cylinders.

PHELPS M. FREER.